United States Patent [19]
Holt

[11] 3,775,891
[45] Dec. 4, 1973

[54] SHRIMP TRAWL WITH ELECTRONIC EXCITATION DEVICE

[75] Inventor: John K. Holt, Clearwater, Fla.

[73] Assignee: International Oceanographic Corporation, Greenwich, Conn.

[22] Filed: Dec. 17, 1971

[21] Appl. No.: 209,195

[52] U.S. Cl. .......................................... 43/9, 43/17.1
[51] Int. Cl. ............................................. A01k 73/02
[58] Field of Search ................................... 43/9, 17.1

[56] References Cited
UNITED STATES PATENTS

| | | | |
|---|---|---|---|
| 953,069 | 3/1910 | Thompson | 43/9 |
| 3,312,011 | 4/1967 | Wathne et al. | 43/9 |
| 2,950,557 | 8/1960 | McDonald | 43/9 |
| 3,043,041 | 7/1962 | Kreltzer | 43/17.1 |

Primary Examiner—Warner H. Camp
Attorney—Deans S. Edmonds et al.

[57] ABSTRACT

A shrimp trawl of the beam type including a frame which is collapsible for storage, side frame members mounting an array of electrodes extending transversely between said frame members and battery powered capacitors mounted on said frame members to transmit pulsed electrical current to said electrodes.

7 Claims, 9 Drawing Figures

PATENTED DEC 4 1973  3,775,891
SHEET 1 OF 4
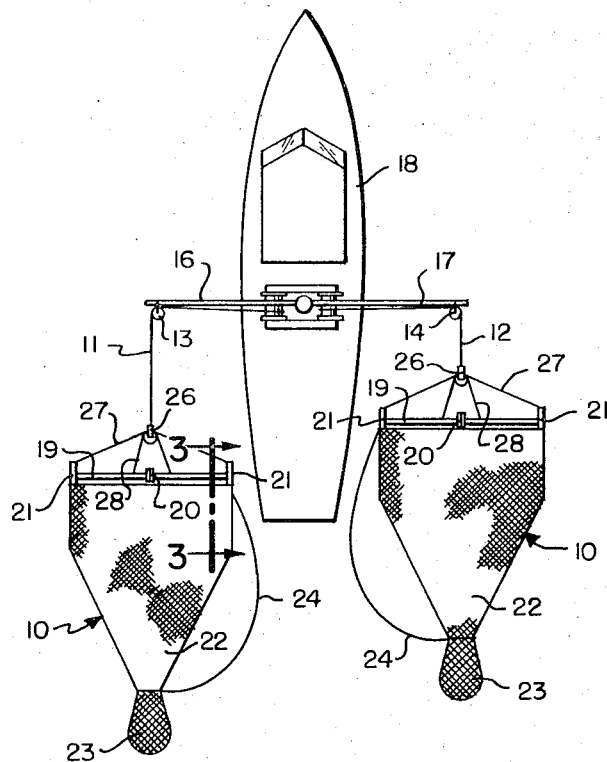
FIG. 1
FIG. 3
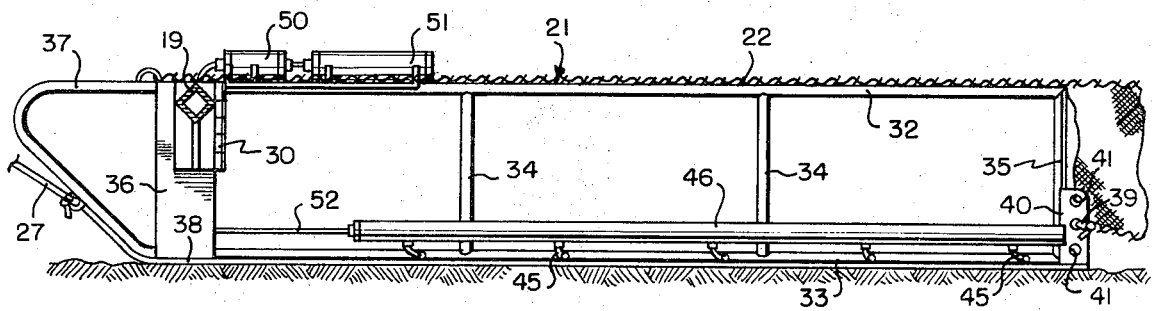
FIG. 4
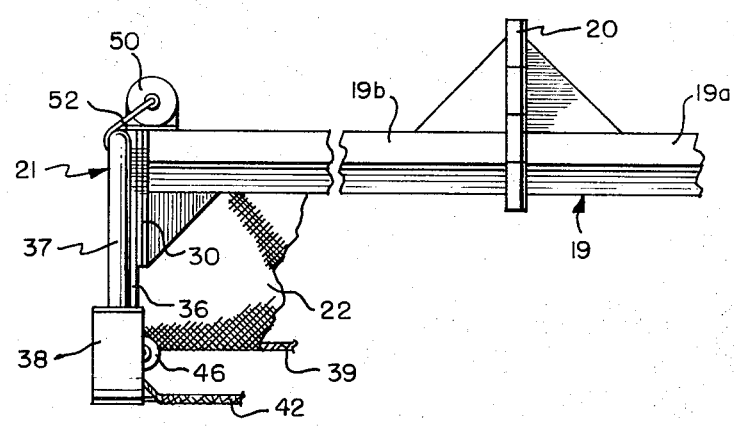

SHRIMP TRAWL WITH ELECTRONIC EXCITATION DEVICE

BACKGROUND OF THE INVENTION

In the commercial fishing industry, a net in the form of a flattened conical bag which is pulled across the sea bed is called a trawl. There are two major types of trawls in use, the beam trawl and the otter trawl. The beam trawl, in use for centuries, is simply a trawl net held open by a wooden beam. The otter trawl, a more recent development, is a trawl which is held open by the force of water around a pair of otter boards or "doors" as the device is pulled through the water.

The beam trawl is the simplest, and is easily pulled through the water, the only drag being caused by the webbing of the trawl net itself and contact with the bottom. It is rather unwieldy to handle on deck, however, and usually only one beam trawl is used by vessels specially rigged for side trawling.

The otter trawl is rather complex in operation, attaining its proper configuration through a dynamic balance of forces rather than simple mechanical structure. The otter trawl, as used in the shrimp fishery, is sensitive to scope ratio, vessel speed, bottom type and net type as well as requiring the continuous expenditure of energy to hold the trawl net spread into fishing configuration. The otter boards not only have a variety of settings themselves, but are affected by various forces caused by the net they are pulling. As a result the otter trawl is rarely at its best while on the bottom working, but collapses into an easily stowed heap when hauled out of the water.

It is known to provide either otter or beam trawls with "ticklers" either mechanical or electrical which cause shrimp lying several inches within the sea bottom to snap upwardly into the path of the trawl net. Electrical excitation of shrimp will produce high yields. However, as yet no system has been adequately devised which can be simply and efficiently operated by a commercial fishing boat. With prior arrangements, cables between the boat and the trawl were used to provide necessary electrical power. These were easily rendered defective and the system generally required a relatively high degree of sophistication to operate.

The subject of the present invention is a trawl which provides more predictable operating characteristics than an ordinary beam trawl, and can be handled on deck by the fishermen at least as easily as the otter trawl. The trawl includes novel self-powered electrical excitation means which will cause shrimp lying in the bottom to snap upwardly into the trawl net.

SUMMARY OF THE INVENTION

In accordance with the present invention a trawl henceforth called a frame trawl has been devised consisting of three major parts: a four-piece hinged metal frame which mounts all electrical excitation equipment, a bridle system, and a modified trawl net. The metal frame is composed of two sides equipped with runners or shoes, and a two-piece hinged beam extends between the sides and is attached to the sides by means of two hinges. The hinges are so arranged that the center of the beam folds back from the direction of tow, and the two sides come together with the folded beam between them for easy handling and storage. The bridle system includes cable connections one at each side of the frame and a center beam connection. The net is similar to a standard shrimp trawl net except that the top body has no corner pieces and is extended beyond the wing tips forward to the beam where it is attached across the full width of the beam. The sides are covered with webbing and the footrope and wings attached at the rear of the sides.

The sides of the metal frame mount capacitors which when energized send pulsed electrical current through electrodes which extend transversely between the sides of the frame and which are dragged across the sea bottom to stimulate shrimp therein. The capacitor electrode system is so low in current loss that the sole source of power may be a pulse generator and battery, also mounted to the frame.

Further aspects of the invention will be described in detail with respect to the following written specification and the accompanying drawing.

BRIEF DESCRIPTION OF THE DRAWING

FIG. 1 is a plan view of frame trawls constructed according to the present invention as they might be initially released from a commercial shrimp boat.

FIG. 3 is a side view of one of the side frame members of the frame trawl.

FIG. 4 is a fragmentary front view of the frame trawl.

DESCRIPTION OF A PREFERRED EMBODIMENT

Figure 2:
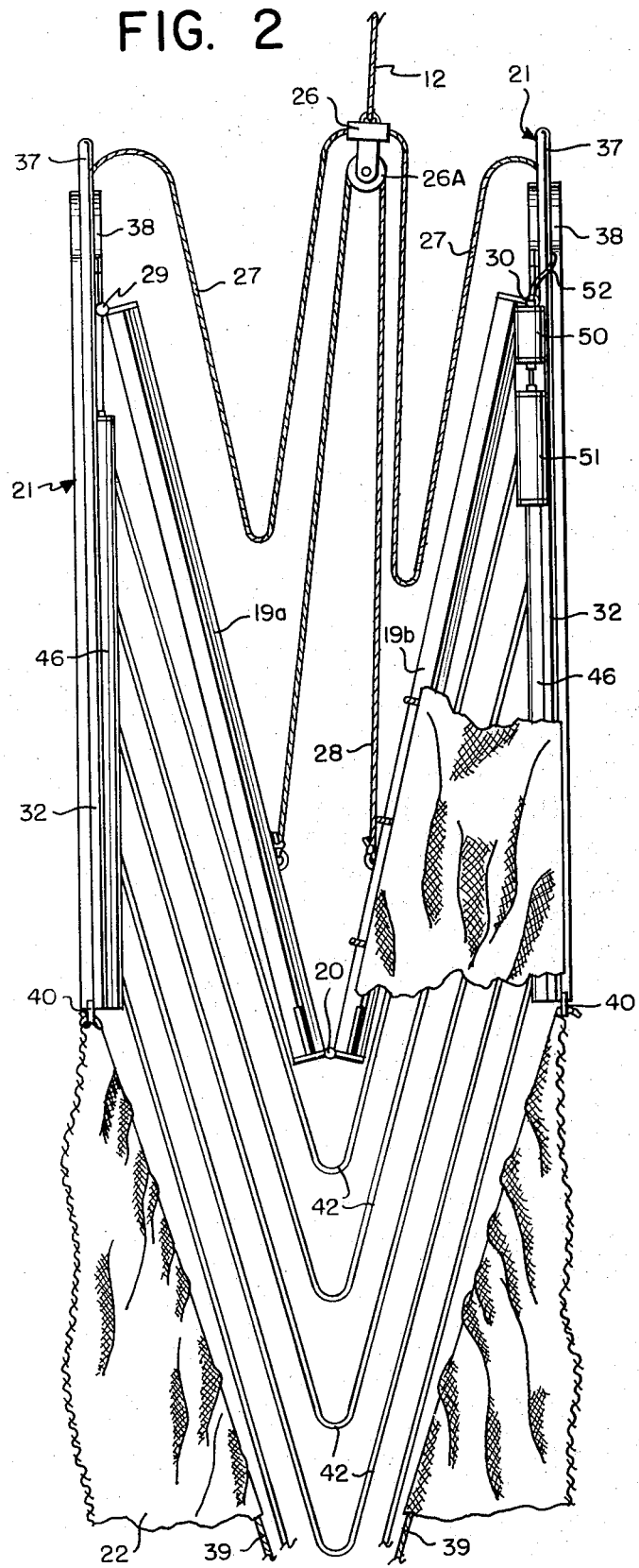
FIG. 2 is an enlarged plan view of one of the trawls of FIG. 1 in a partially collapsed condition.

Referring now to the drawing and initially to FIG. 1, two frame trawls 10 constructed according to the principles of the present invention are shown connected by means of lines 11 and 12 which pass through the blocks 13, 14 connected to booms 16, 17 extending from commercial shrimp boat 18. It will be understood that the illustration of FIG. 1 is largely diagrammatic and that frame trawls 10 will normally be towed at some distance behind a boat along the sea bottom. In general terms, each trawl 10 includes a beam 19 center hinged at 20 which is connected by hinges to two side frame members 21. A net 22 is attached to the beam 19 which thus acts as a headrope, the net extending in conical fashion aft of frame members 21 to form a cod end or bag 23 into which shrimp caught in the net will be received. By using the lazy line 24, the cod bag may be emptied in the standard fashion. The dimensions of each frame trawl are those of beam trawls generally. For example, the width of the beam may be 30 ft. each side frame member 15 ft., the overall length of the trawl being about 60 ft. Each of the lines 11 and 12 are connected to a shackle to which are attached tow lines 27 extending from each side 26A member. Central tow lines 28 pass through a block 26 mounted to the shackle 26 and are fastened to the beam 19 on each side of the hinge 20.

In accordance with one aspect of the invention, the frame trawl 10 can be folded or collapsed in the manner shown in FIG. 2 for easy handling and storage on the deck of the shrimp boat. Accordingly, the beam consists of pipe elements 19a, 19b, is center hinged at 20 and hinged at 29 and 30 to each side frame member 21. While the frame trawl 10 is being towed, the bridle maintains the beam in its extended condition. However, as can be seen in FIG. 2, the side frame members can be brought readily together adjacent to beam elements 19a and 19b and since the length of each beam element 19a, 19b is approximately the same as the length of side frame members 21, the frame trawl collapses into a compact envelope. It will be understood that the trawl is collapsed only when it is desired to put the trawl on deck and that shrimp can be removed from the cod back by drawing the trawl near the boat and by operating the lazy line. Also, the battery 50 powering the electrical excitation system of the invention can be serviced or replaced from the boat without removing the trawl from the water.

Figure 5:
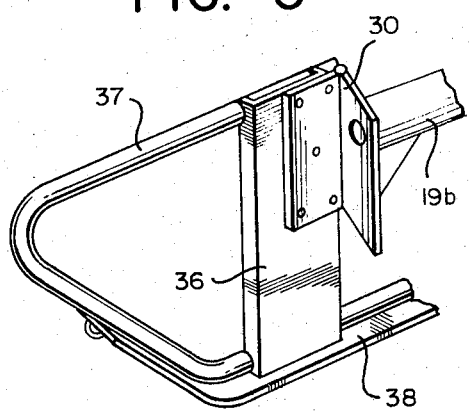
FIG. 5 is a detail of the forward part of one of the side frame members.

Referring to FIG. 3, each side frame member 21 consists of upper and lower longitudinal frame elements 32 and 33 which are welded securely to vertical intermediate members 34 and terminal posts 35 and 36, the latter being rectangular so as to facilitate mounting of hinges 29 and 30. As best seen in FIGS. 3 and 5, triangular runner 37 projects forwardly from each post 36. Secured underneath each longitudinal frame element 33 and forwardly to runners 37 is a plate or shoe 38 upon which the frame members rest and slide along the sea bottom.

Figure 6:
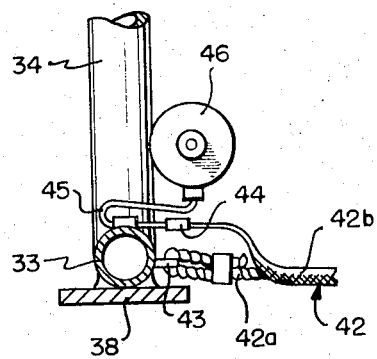
FIG. 6 is a detail of an electrode connection to the frame.

As seen in FIG. 3, the lower portion of the net 22 is attached by a footrope 39 to the vertical bracket 40 having holes 41 therein at different heights to permit lowering or raising of the footrope. As seen in FIG. 2, a plurality of electrodes 42 extend transversely between the side frame members 21 to form a field approximately 10 ft. in length and 30 ft. wide. Electrical current passes from an electrode through sea water and the sea bottom into an adjacent electrode. Pulsed electrical current, for example at 3.5 pulses per second will cause involuntary snapping movements of shrimp which have burrowed even 6 inches into the sea bottom. For different depths of burrowed shrimp and different bottom conditions a certain number of sprimp movements (say from 1 to 10) must occur before a shrimp will jump from the bottom. It has been estimated that involuntary muscular movements of shrimp will not occur with sufficient strength more frequently than four movements per second and therefore if average boat speed is 5 feet per second, in order for shrimp deeply buried in the sea bottom to move sufficiently upwardly into the path of the net, the electrodes must extend in a front to rear direction for at least 10 ft. As seen in FIG. 6, each electrode 42 has a nylon core 42a surrounded by a meshed copper wire sheathe 42b. The nylon core is attached to an eye 43 secured to lower frame element 33 while the outer copper sheathe 42b is connected in a slip-joint connector 44 to electrical lead 45 from a capacitors which governs current flow to the electrode.

It will be seen in FIG. 3 that a tube 46 is secured to vertical frame elements 34 and thus at each side of the trawl to frame members 21. The purpose of tube 46 is to house electrical components (FIG. 9) against the intromission of sea water, such components being connected to respective electrodes 42. Mounted to the inboard side frame members 21 is a battery 50 and pulse trigger generator 51 which are secured to the upper longitudinal frame element 32 and which are connected by means of electrical lead 52 to the circuitry of FIG. 9. Battery 50 is capable of sustained 100 watt output, which except for the fact that the distances between capacitors and electrodes are very short, would not be sufficient to provide the one-volt energization required throughout the electrode field. In the particular arrangement, a relatively long time period of 125 milliseconds is available for capacitors forming part of the pulse generator circuit to reach full charge. Since this relatively long charge period is available, the capacitors can be charged relatively slowly, which increases the efficiency of the circuit. By charging slowly lead length becomes unimportant allowing the control unit i.e. battery 50 and pulse trigger generator 51 to be located at any convenient location.

In accordance with the present invention, a unique positioning of the pulse trigger generator circuit 51 with respect to the remainder of the pulse generator circuit is provided such that capacitors used to provide the high current pulse necessary for shrimp excitation are intimately located adjacent to the electrode array and may be brought slowly to charge levels by more remotely positioned portions of the pulse trigger generator circuit 51. As a consequence, high current high loss discharge lines are short and the low current charging lines can be any length necessary to conveniently locate the balance portions of the pulse trigger generator and its battery power. The increased efficiency of this arrangement allows the pulse generator circuit and electrodes to be operated by battery power mounted on the frame.

Figure 7:
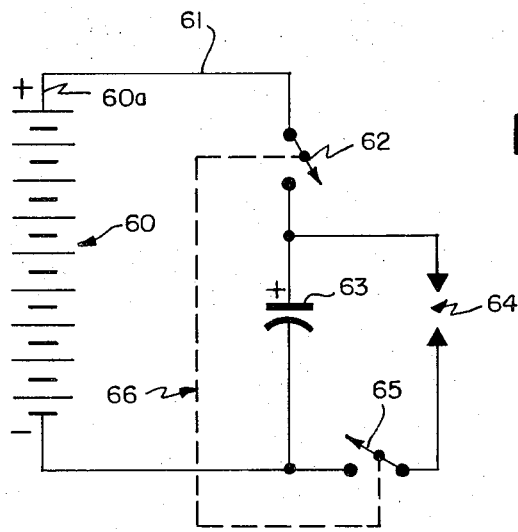
FIGS. 7–9 are schematic electrical diagrams illustrating the electrode excitation circuit of the invention.

Referring to FIG. 7 for purposes of illustration only, a simplified pulse generator circuit has been shown in which the positive terminal 60a of a battery 60 is connected through line 61 to switch 62. The other side of switch 62 is connected to the positive terminal of capacitor 63 and to one side of an electrode pair 64. Switch 62 when closed charges capacitor 63 and is then opened. Switch 65 is closed causing capacitor 63 to discharge through electrode pair 64. Interconnecting means 66 are provided to prevent both switches 62 and 65 from being closed at the same time.

Figure 8:
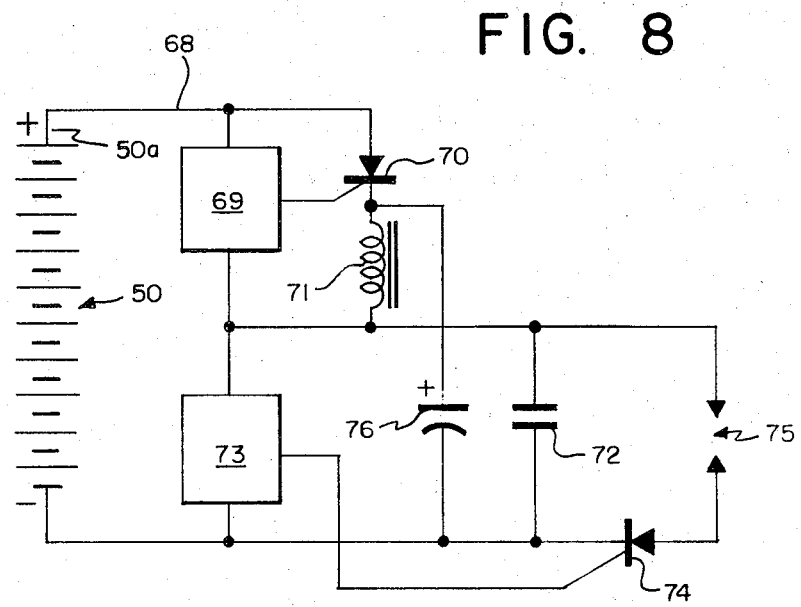
Figure 9:
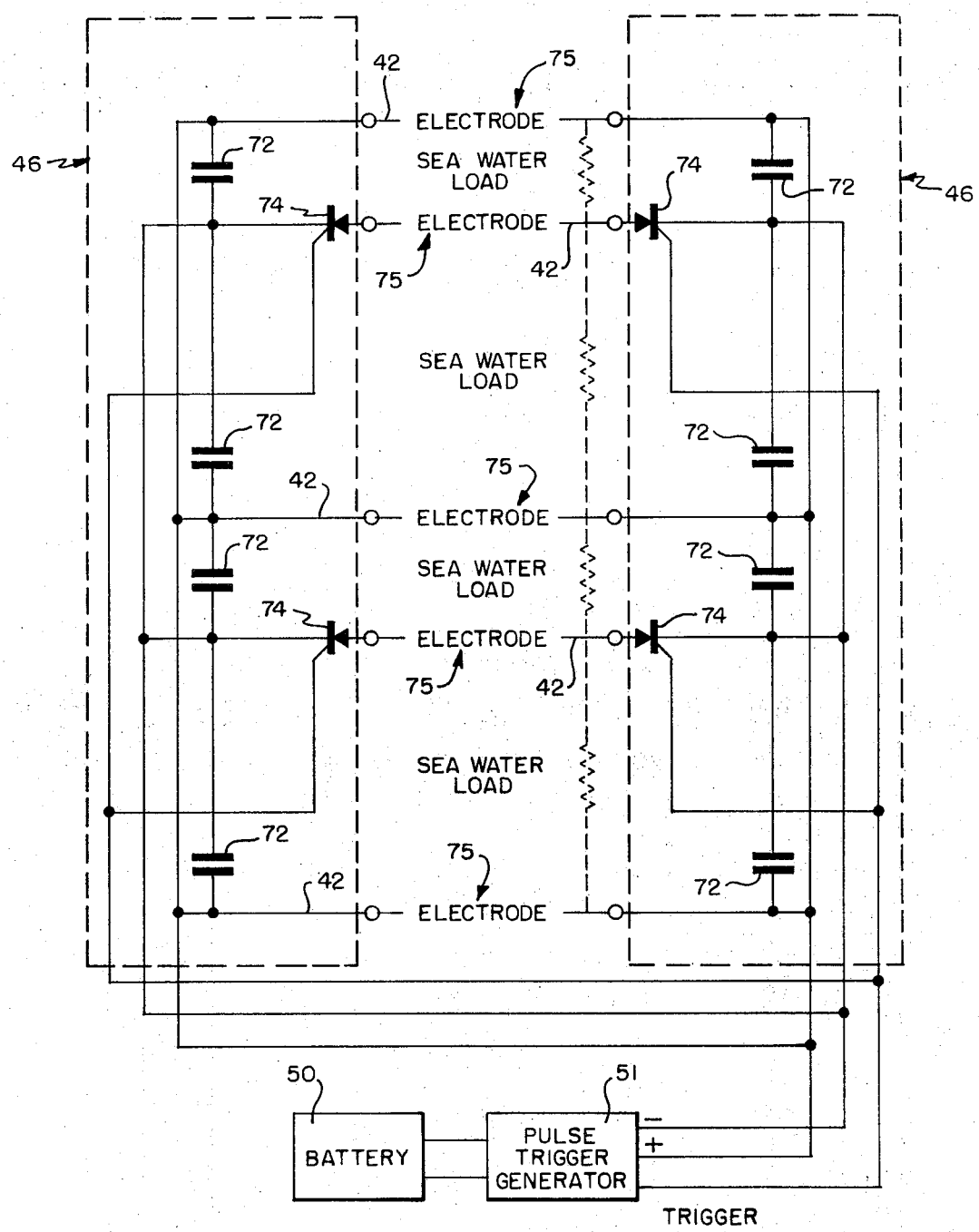

With reference to FIG. 8, the pulse generator circuit actually employed in carrying out the present invention has been illustrated. The positive terminal 50a of battery 50 is connected by line 68 to SCR 70 (analogous to switch 62) and the timing circuit 69 which controls SCR 70. After a preset time, timing circuit 69 turns on SCR 70 which charges capacitors 72 (which in the diagram of FIG. 9 are actually a plurality of capacitors) through choke 71. Choke 71 turns off SCR 70 when capacitors 72 are fully charged. Therefore at this point, the same voltage exists across timing circuit 69 which deactivated this timing circuit. At the same time voltage is applied across timing circuit 73, activating it causing circuit 73 to turn on SCR 74 (which in the diagram of FIG. 9 are actually a plurality of SCR's), thereby discharging capacitor 72 through electrode array 75. The circuit formed by capacitor 76 and choke 71 acts to shut off SCR's 74. There is then no longer any voltage across timing circuit 73 which deactivates this circuit and voltage again appears across timing circuit 69 causing the pulse cycle to repeat.

Referring now to FIG. 9, there has been shown the plurality of SCR's 74 and the plurality of capacitors 72 referred to in FIG. 8 in combination with an electrode array 75 consisting of individual electrodes 42. It will be noted that capacitors and SCR's on both sides are housed entirely within tube 46 which is sealed against the intrusion of sea water and that the connection with the electrodes by the capacitors is disbursed along the frame throughout tube 46 so that extremely short paths are provided for high current flow. Thus, voltage drop occurs essentially only in the electrode array which is highly efficient and permits the use of a battery to power the circuit.

It will be understood that the foregoing description has been of a particular embodiment of the invention and is therefore merely representative. In order to appreciate fully the scope of the inveniton, reference should be made to the appended claims.

I claim:

1. A trawl for gathering sea bottom dwelling creatures such as shrimp comprising a framework having two generally parallel substantially rigid side frame members separated by a beam connected between forward portions of each frame member, each frame member extending longitudinally for a predetermined rearward distance, net means attached to said framework, a bridle for towing said trawl connected to forward portions of said side frame members, shoe means along the bottom of each frame member for supporting movement of the trawl along the sea bottom, a plurality of electrodes attached to said framework and adapted to come into contact with the sea bottom, capacitors mounted to said framework immediately adjacent to said electrodes, electrical circuit means connecting said capacitors and electrodes, at least one battery mounted to said framework, a pulse trigger generator mounted to said framework, and circuit means interconnecting said battery, pulse trigger generator, and capacitors and electrodes for developing and sending pulses of electrical current into the sea bottom in an improved manner due to the adjacent relative positioning of said capacitors and electrodes on said framework and the resultant reduced current paths therebetween.

2. The trawl according to claim 1 wherein said electrodes extend transversely between said side frame members.

3. The trawl according to claim 2 wherein each electrode has a central core of textile fiber surrounded by a metal sheathe, and quick disconnect means for connecting said sheathe to one of said capacitors.

4. The trawl according to claim 1 wherein said beam has a center hinge and is hinged at each of its connections with said side frame members whereby said trawl can be folded for storage and handling.

5. The trawl according to claim 4 wherein said bridle is connected to the beam at each side of said center hinge.

6. A shrimp trawl comprising a framework having two generally parallel substantially rigid frame members separated by a beam connected between forward portions of said members, net means attached to said framework, a plurality of electrodes attached to said framework, electrical circuit means mounted on said framework immediately adjacent to said electrodes, and battery powered circuit means carried by said framework and connected to said electrodes and said immediately adjacent circuit means for developing and sending pulsed electrical current through said electrodes over a sustained period, said electrical circuit means providing very short paths for transmitting high current to said eletrodes due to the immediately adjacent positioning of said electrical circuit means with respect to said electrodes.

7. The shrimp trawl according to claim 6 wherein a pulse trigger generator circuit and a battery are located on said framework remotely from said electrodes and the electrical circuit means for sending pulses through said electrodes includes capacitors distributed along said framework immediately adjacent to said electrodes.

* * * * *

PO-1050
(5/69)

UNITED STATES PATENT OFFICE
CERTIFICATE OF CORRECTION

Patent No. 3,775,891          Dated December 4, 1973

Inventor(s) John K. Holt

It is certified that error appears in the above-identified patent and that said Letters Patent are hereby corrected as shown below:

Title Page, under "References Cited", after "3,043,041

7/1962", "Kreltzer" should read --Kreutzer--.

Column 2, line 58, "26A" should read --frame--;

line 59, "26" should read --26A--.

Column 3, line 40, "sprimp" should read --shrimp--.

Signed and sealed this 23rd day of April 1974.

(SEAL)
Attest:

EDWARD M.FLETCHER,JR.          C. MARSHALL DANN
Attesting Officer          Commissioner of Patents